(12) United States Patent
Palikaras et al.

(10) Patent No.: US 10,996,385 B2
(45) Date of Patent: May 4, 2021

(54) FILTER MADE OF METAMATERIALS

(71) Applicant: Lamda Guard Technologies Ltd., London (GB)

(72) Inventors: George Palikaras, London (GB); Themos Kallos, London (GB)

(73) Assignee: Lamda Guard Technologies Ltd., London (GB)

( * ) Notice: Subject to any disclaimer, the term of this patent is extended or adjusted under 35 U.S.C. 154(b) by 184 days.

(21) Appl. No.: 16/170,568

(22) Filed: Oct. 25, 2018

(65) Prior Publication Data

US 2019/0146133 A1   May 16, 2019

Related U.S. Application Data

(62) Division of application No. 14/349,931, filed as application No. PCT/GB2012/052518 on Oct. 10, 2012, now Pat. No. 10,698,143.

(30) Foreign Application Priority Data

Oct. 10, 2011 (GB) ..................................... 1117580

(51) Int. Cl.
*G02B 5/22* (2006.01)
*G02B 1/00* (2006.01)
(Continued)

(52) U.S. Cl.
CPC .............. *G02B 5/22* (2013.01); *G02B 1/005* (2013.01); *G02B 5/0816* (2013.01);
(Continued)

(58) Field of Classification Search
CPC .. G02B 5/20–289; G02B 5/0816–0875; G02B 1/005; G02B 1/007
See application file for complete search history.

(56) References Cited

U.S. PATENT DOCUMENTS

| 3,711,181 A | 1/1973 | Adams, Jr. |
| 4,501,470 A | 2/1985 | Yeh |

(Continued)

FOREIGN PATENT DOCUMENTS

| CN | 1049929 A | 3/1991 |
| CN | 1496494 A | 5/2004 |

(Continued)

OTHER PUBLICATIONS

Summons to Oral Proceedings dated Mar. 1, 2108 in European Patent Application No. 12780779.0.

(Continued)

*Primary Examiner* — Cara E Rakowski
(74) *Attorney, Agent, or Firm* — McDonnell Boehnen Hulbert & Berghoff LLP

(57) ABSTRACT

There is provided a filter for filtering electromagnetic radiation, wherein said filter is arranged to transmit electromagnetic radiation of a first predetermined wavelength and to block transmission of electromagnetic radiation of a second, different predetermined wavelength; said filter comprising a first metamaterial. Optionally, the metamaterial may be formed of a plurality of material elements wherein each material element is at least one-dimensional and the size of the material element along each dimension is no greater than the size of the second predetermined wavelength. The filter comprises a second metamaterial arranged to provide second filtering of electromagnetic radiation.

13 Claims, 11 Drawing Sheets

(51) Int. Cl.
 *G02B 5/20* (2006.01)
 *G02B 5/08* (2006.01)
(52) U.S. Cl.
 CPC ......... *G02B 5/0825* (2013.01); *G02B 5/0841* (2013.01); *G02B 5/20* (2013.01)

(56) References Cited

U.S. PATENT DOCUMENTS

| | | | |
|---|---|---|---|
| 4,637,378 A | 1/1987 | Sasa | |
| 4,637,678 A * | 1/1987 | Moss | G02B 5/32 359/15 |
| 4,786,505 A | 11/1988 | Lovgren | |
| 4,986,635 A | 1/1991 | Spry | |
| 5,103,323 A | 4/1992 | Magarinos et al. | |
| 5,281,370 A | 1/1994 | Asher et al. | |
| 5,418,671 A | 5/1995 | Schoettle et al. | |
| 5,539,544 A * | 7/1996 | Le Paih | G02B 5/32 359/15 |
| 5,892,559 A | 4/1999 | Sharp | |
| 6,961,175 B2 | 11/2005 | Toda et al. | |
| 7,031,566 B2 | 4/2006 | Kochergin | |
| 7,187,491 B1 | 3/2007 | Bratkovski | |
| 7,242,523 B2 | 7/2007 | Toda et al. | |
| 8,314,621 B1 | 11/2012 | Morse | |
| 2001/0002275 A1 | 5/2001 | Odenburg et al. | |
| 2003/0042487 A1 | 3/2003 | Sarychev | |
| 2003/0059616 A1 | 3/2003 | Hartley | |
| 2004/0070824 A1 | 4/2004 | Toda et al. | |
| 2007/0002433 A1 | 1/2007 | Chen | |
| 2008/0170039 A1 | 7/2008 | Shin et al. | |
| 2008/0230752 A1 | 9/2008 | Bower et al. | |
| 2009/0059406 A1 | 3/2009 | Powers et al. | |
| 2009/0262766 A1 | 10/2009 | Chen | |
| 2010/0027001 A1 | 2/2010 | Moser | |
| 2010/0091224 A1 | 4/2010 | Cho et al. | |
| 2010/0091225 A1 | 4/2010 | Cho et al. | |
| 2010/0118407 A1 | 5/2010 | Huff | |
| 2010/0149483 A1 | 6/2010 | Chiavetta | |
| 2010/0255192 A1 | 10/2010 | Hong et al. | |
| 2010/0290021 A1 | 11/2010 | Pazidis et al. | |
| 2011/0075263 A1 | 3/2011 | Liberman et al. | |
| 2011/0098033 A1 | 4/2011 | Britz et al. | |
| 2011/0175795 A1 | 7/2011 | Toujo | |
| 2011/0285942 A1 | 11/2011 | Guo | |
| 2012/0139960 A1 | 6/2012 | Shinx | |
| 2012/0229905 A1 | 9/2012 | Axel | |
| 2012/0287522 A1 | 11/2012 | Ofir | |
| 2014/0329172 A1 | 11/2014 | Hart et al. | |
| 2015/0338683 A1 | 11/2015 | Perricone et al. | |
| 2017/0043389 A1 | 2/2017 | Imamura et al. | |
| 2017/0176650 A1 | 6/2017 | Govorov | |

FOREIGN PATENT DOCUMENTS

| | | |
|---|---|---|
| CN | 197134 A | 5/2007 |
| DE | 102007054731 | 5/2009 |
| EP | 434273 | 8/1997 |
| FR | 2924820 | 6/2009 |
| FR | 2 939 907 | 6/2010 |
| JP | 2004-333671 | 11/2004 |
| JP | 2005-101109 | 4/2005 |
| JP | 2007 299011 | 11/2007 |
| JP | 2007-299011 | 11/2007 |
| JP | 2008-525836 | 7/2008 |
| JP | 2008-191097 | 8/2008 |
| JP | 2008-538618 | 10/2008 |
| JP | 2009 282093 | 12/2009 |
| JP | 2010-264755 | 11/2010 |
| WO | 1997023789 | 7/1997 |
| WO | 2009/064860 | 5/2009 |
| WO | 2010076485 | 7/2010 |
| WO | WO 2011/148701 | 12/2011 |
| WO | WO 2012/007147 | 1/2012 |
| WO | WO 2012/094410 | 7/2012 |
| WO | 2016012813 | 1/2016 |

OTHER PUBLICATIONS

European Patent Office, Examination Report for European Patent Application No. 12789779.0 dated Apr. 17, 2017.
F.D. Hatfield, "Reporting of Laser Illumination of Aircraft", U.S. Department of Transportation Federal Aviation Administration Advisory Circular, Feb. 8, 2013, AC No. 70-2A.
James J. Ballough, "Outdoor Laser Operations", U.S. Department of Transportation Federal Aviation Administration Advisory Circular, Dec. 30, 2004, AC No. 70-01.
European Patent Office, Examination Report for European Patent Application No. 12 780 779.0, dated Jun. 23, 2016, consisting of 5 pages.
U.S. Department of Transportation Federal Aviation Administration, Outdoor Laser Operations, Advisory Circular No. 70-1, dated Dec. 30, 2004.
State Intellectual Property Office of China, Office Action for Chinese Patent Application No. 201280049648.7, dated Oct. 10, 2015.
Japan Patent Office, Office Action for Japanese Patent Application No. 2014-533995, dated Oct. 27, 2015.
European Patent Office, Examination Report for European Patent Application No. 12780779.0, dated Dec. 8, 2015.
Canadian Intellectual Property Office, Office Action for Canadian Patent Application No. 2, 851,347, dated Jan. 14, 2016.
International sEarch Report and Written Opinion, International Application: PCT/GB2012/052518; "Filter Made of Metamaterials," Date Search Completed: Feb. 28, 2013, dated Mar. 7, 2013.
Search Report, Great Britain Application No. GB1117480.2; "Filter Made of Metamaterials," Date of Search: Feb. 17, 2012.

* cited by examiner

FILTER MADE OF METAMATERIALS

CROSS-REFERENCE TO RELATED APPLICATIONS

This application is a divisional of U.S. patent application Ser. No. 14/349,931, filed Apr. 4, 2014, which is hereby incorporated herein by reference in its entirety. U.S. patent application Ser. No. 14/349,931 is a U.S. National Stage application under 35 U.S.C. § 371 of International Patent Application no. PCT/GB2012/051518, filed Oct. 10, 2012, which claims the benefit of priority of U.K. Patent Application no. 1117480.2, filed Oct. 10, 2011.

FIELD

The invention relates to filter for filtering electromagnetic (EM) radiation and a method for designing and making the same. In particular it relates to a barrier that can filter one or more specific narrow optical frequencies and can be optically transparent to other frequencies of electromagnetic radiation.

BACKGROUND

Electromagnetic radiation filters are well known and have many practical uses. One such use is in filtering laser light in order to protect individuals from its effects. As is well known, when the eye is exposed to laser light, significant damage can occur. This is mainly due to the absorption of incoming photons and the heating of the living eye tissue. The potential damage depends on the intensity of the laser, that is the energy per second from the laser impacting on a given surface area, and the duration of the exposure. Two known types of laser are continuous wave (CW) and pulsed lasers. CW lasers are classified based on their power output whereas pulsed lasers are classified based on their total energy per pulse.

Protection from laser light has become increasingly important in everyday practical situations due to the proliferation of cheaper and more powerful laser systems. Certain laser products have in recent years become cheap to manufacture and thus commercially readily available. These products include so-called "laser pens" or "laser light pointers". In the UK there are regulations in place such that it is only allowable to manufacture and sell laser light pointers having a power of up to 5 milliWatts (mW). However these regulations are not consistent worldwide and it is possible in some countries to purchase cheaply a 1 Watt laser light pointer which has an effective area of up to four times the effective area of the most powerful laser light pointer available in the UK, and which can cause cornea damage to the human eye from as much as three miles away. Unfortunately there has been an increase in incidents of laser light pointers being deliberately pointed at vehicle drivers and also at aircraft whilst in flight. These incidents have potentially extremely serious safety consequences. Although laser light pointers do not have the ability to damage or destroy most vehicles or aircraft, they can and often do interfere with the ability of the driver, pilot or crew to maintain sufficient visual contact with the road, flight path or runway.

The potential safety consequences are particularly grave when a laser light pointer is directed at an aircraft during take off or landing.

Aircraft need to be at a relatively low altitude in order to be affected by the use of laser pointers on the ground. For this reason aircraft are most vulnerable during the approach phase of landing. During this phase an aircraft will typically be flying at around 6,000 feet and be lined up with the runway descending at a relatively steady rate of around 700 feet per minute. This makes the aircraft an object easy to aim at with a laser pointer. At the same time the crew onboard the aircraft will be increasingly focused on external cues outside the aircraft which allow the crew to control the speed, rate of descend and heading of the aircraft towards a successful landing on the runway. This makes the crew more prone to being affected by a laser beam pointer and potentially even to receive serious eye injuries. This is certainly the case when the crew is conducting a "visual landing" or a "non-precision landing". During both such landing phases the flight crew navigate using primarily external cues to complete the approach and landing.

If a laser light is pointed at the crew at any stage of the approach phase the crew might be injured, lose momentarily sight of the runway or decide that a safe interference-free landing is not possible. This may lead to a "go-around" or "abort" in order to avoid an event which may significantly endanger the aircraft and the safety of those onboard. The go-around and its related procedures may lead to increased work load for flight crew and Air Traffic Control, which in turn may introduce other threats to safety. In busy airports such as those found in Europe, a go-around procedure might result in a high workload and relatively hazardous situation.

Pointing portable lasers at aircraft can also have an impact on the efficiency and cost of airline operations. A go-around involves the aircraft spooling the engines to a thrust setting of a take-off while climbing and then returning to the initial approach point to attempt another landing, all of which may last anywhere between 10 and 20 minutes. During such a manoeuvre, a 747-400 aircraft might burn up to 4 tonnes of additional fuel which at current prices may amount to around 6,000 USD. Other factors such as missed passenger connections and aircraft utilisation may make a go-around even more expensive.

There are many safety regulations and systems already in place for aircraft. Unfortunately some systems and procedures introduced to improve safety may actually increase the potential severity of laser pointers being aimed at aircraft. For example the use of Head-Up-Display systems (HUD), an expensive technology once used only in military aircraft, is finding its way increasingly into everyday commercial aircraft operations. The system is comprised of a glass in front of the pilot on which flight parameters and the position of the aircraft in relation to the runway are displayed. This system allows the flight crew to observe external cues as well as the aircraft attitude and speed (among other parameters) without having to look down to the instrument panel. This results in flight crew looking towards and out of the windshield throughout the approach and landing phase. Thus any laser point device aimed at the aircraft windshield will in all probability result in adverse effects to the crew.

There are numerous known solutions for filtering out laser light to protect user safety. For example Laser Protection Systems (LPS) are routinely used in laboratories around the world. They typically come in the form of goggles, eye-shields or contact lenses which are worn by the person susceptible to the laser radiation. They also come in the form of windows, which are placed around the laser location to protect the surroundings. These filters are usually built using polymers for low intensity lasers or glass for high heat densities.

There are several disadvantages associated with currently available LPS. They usually operate over a single band of light, providing protection from a single type of laser only.

Additionally they are not sufficiently narrowband, thus they block more light than necessary and so distort the user's overall vision. LPSs are also usually tinted, artificially colouring the field of view. They therefore cannot always be used—for example, it is unsafe for an airline pilot to wear red goggles while flying an aircraft at night. And glass-based filters are heavy and cannot be comfortably worn by people.

No known system can provide filtration of electromagnetic radiation which is sufficiently accurate and focused for many practical purposes without distorting the propagation of electromagnetic radiation at other wavelengths that the user does not wish to filter. Furthermore many existing filters are impractical and/or too expensive for widespread use.

Aspects of an invention are set out in the appended independent claims.

There is provided a filter for selectively filtering electromagnetic radiation. The filter comprises a first metamaterial and a second metamaterial. Each metamaterial comprises a plurality of structural features having a size less than a predetermined wavelength. Electromagnetic radiation at the predetermined wavelength is blocked by the metamaterial owing to the carefully chosen structural features. The structural feature may be a thickness of a dielectric layer. The metamaterial may comprise a plurality of material elements and the structural feature may be the size of the material elements. The material elements may comprise any of: a metallic shape, a photonic crystal, a polymer material element or a liquid crystal. The metamaterials may comprise a nanostructured material, made from nanoscale material elements. The filter may provide optical transparency at all frequencies except at the selected frequency or frequencies which it is configured to block. Therefore it does not distort user vision except at the frequencies that have been deliberately blocked, for example particular laser frequencies that could cause harm to the user. The filter may block a single narrow frequency band or it may block a plurality of distinct narrow frequency bands. By combining metamaterials. the filter may block a selected frequency or selected frequencies of radiation over a range of angles.

FIGURES

Embodiments and aspects will now be described with respect to the figures of which:

FIG. 5c shows a side view of the filter of FIG. 5a;

OVERVIEW

Figure 1:
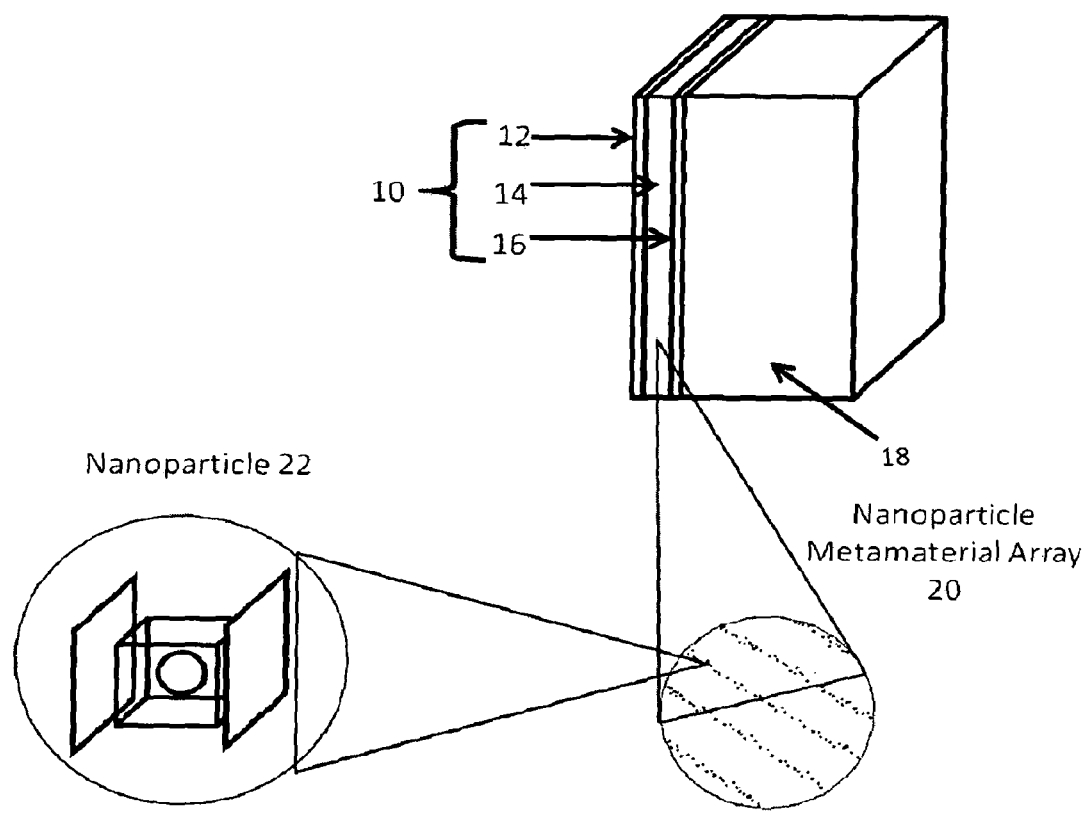
FIG. 1 shows a filter including a metamaterial comprising an array of nanoscale unit cells, including a magnified view of said array and a further magnified view of one unit cell.

In overview a filter is provided for filtering out electromagnetic radiation at a particular desired wavelength or range of wavelengths.

A filter is provided that may be, for example, be optically transparent to all incoming light in the visible electromagnetic spectrum with the exception of one or more predetermined narrow bands of wavelengths. For example the optical filter may be non-transparent only to red light, or to green light, or to red and green light and so on. The wavelength or wavelengths to which the filter is optically non-transparent can be simultaneously attenuated inside the filter by means of a carefully designed metamaterials such as a nanostructured metamaterial. Alternatively, the filtering can be implemented using a Bragg Mirror or helices formed from liquid crystals.

Preferably the optical filter is provided in the form of a thin film. The thin film can be adhesive so as to be applied on any optically transparent surface such as windscreen, window, glass pane or optical lens. A unique arrangement of structural features is comprised within the thin film structure, thus protecting a person or persons located behind the filter from concentrated light sources such as a laser operating at the predetermined wavelengths. Thus the filter can protect users from laser radiation at chosen predetermined wavelengths in a passive manner.

DETAILED DESCRIPTION

Laser safety zones have been defined for an aircraft by the Federal Aviation Authority (FAA) in the USA, which imposes the requirements of maximum allowed laser intensity at different distances from an airport. For about 7 NM from the runways and for up to 2000 feet high the zone should be laser-free, i.e. having a maximum intensity of 50 nW/cm^2. The critical flight zone extends up to 8000', with an allowed intensity of 5 μW/cm^2. Beyond that zone there is the sensitive flight zone, with a maximum intensity of 100 μW/cm^2. However these guidelines are only followed by laser users voluntarily when the FAA is notified about nearby laser operations. These guidelines are not always adhered to and, as discussed in the background section above, increasingly such guidelines are deliberately ignored. The filter described herein can be used to protect individuals from damage incurred due to lasers when such guidelines are ignored.

Particular filter embodiments are described in detail below. In general terms, the solution provided herein comprises a filter which can be provided in the form of a relatively thin film with a typical thickness ranging from a few nanometres to a few millimetres, which can be applied to the inside or outside of an optically transparent surface such as a windscreen at the front of an aircraft. The film can be applied to the windscreen using an adhesive. The film itself may comprise an adhesive layer so as to be self adhesive or any appropriate separate adhesive may be used. The film is designed so as to be durable and easy to both clean and maintain. Furthermore it is able to maintain its mechanical and optical properties in different environmental conditions such as changing temperature and changing levels of heat and solar radiation.

Although it is very thin, the film can comprise layers of different materials or periodic repetitions of two or more materials. Therefore it can be designed for multiband performance. The layers and/or the components within the film can be selected so as to provide user protection from laser light at one or more narrow bands of wavelength. It can protect the user from lasers having a power of anything from around 5 milliWatts up to 2 Watts (class IV lasers) and has the capability to protect from higher-power lasers, once they are developed. For all other visible wavelengths of light, except those which have been selected for filtration by the film, the film is optically transparent at all polarisations and angles of incidence. Therefore it will not distort the user's vision of "normal" light when it is being used to filter out particular wavelengths of laser light.

The filter is a passive system that does not require an external power source or an active control system in order to operate. Once the filter has been installed, for example by being adhered to a windscreen, it can continue to operate over a long period of time without any upkeep being needed or operating costs being incurred.

A variety of different materials can be used to manufacture the filter, as discussed in more detail below. The filter can be manufactured using some or all of: liquid crystal materials, polymers, nanocomposite or nanostructured metamaterials or photonic crystal components. It can be manufactured from 100% recyclable materials and therefore it is an environmentally friendly solution.

According to an embodiment the filter is provided in the form of a film. The film may comprises metamaterial elements such as metamaterial metallic nanoparticles.

Metamaterials are artificially created materials that can achieve electromagnetic properties that do not occur naturally, such as negative index of refraction or electromagnetic cloaking. While the theoretical properties of metamaterials were first described in the 1960s, in the past 10-15 years there have been significant developments in the design, engineering and fabrication of such materials.

One example of a metamaterial comprises a multitude of unit cells, i.e. multiple individual elements (sometimes refer to as "meta-atoms") that each has a size much smaller than the wavelength of operation. These unit cells are microscopically built from conventional materials such as metals and dielectrics. However, their exact shape, geometry, size, orientation and arrangement can macroscopically affect light in an unconventional manner, such as creating resonances or unusual values for the macroscopic permittivity and permeability. These individual elements or meta-atoms may be considered as "structural elements" or "material elements" having a size no greater than a predetermined wavelength.

Some examples of available metamaterials are negative index metamaterials, chiral metamaterials, plasmonic metamaterials, photonic metamaterials, etc. Due to their sub-wavelength features, metamaterials that operate at microwave frequencies have a typical unit cell size of a few millimetres, while metamaterials operating at the visible part of the spectrum have a typical unit cell size of a few nanometres. Metamaterials are also inherently resonant, i.e. they can strongly absorb light at certain narrow range of frequencies.

For conventional materials, the electromagnetic parameters such as magnetic permeability and electric permittivity arise from the response of the atoms or molecules that make up the material to an electromagnetic wave being passed therethrough. In the case of Metamaterials, these electromagnetic properties are not determined at an atomic or molecular level. Instead these properties are determined by the selection and configuration of a sub-wavelength structural elements such as a collection of smaller objects that make up the Metamaterial. Although such a collection of structural elements and their structure do not "look" at an atomic level like a conventional material, a Metamaterial can nonetheless be designed so that an electromagnetic wave will pass therethrough as if it were passing through a conventional material. Furthermore, because the properties of the Metamaterial can be determined from the composition and structure of such small (nanoscale) objects, the electromagnetic properties of the Metamaterial such as permittivity and permeability can be accurately tuned on a very small scale.

Another form of a metamaterial comprises multiple dielectric layers wherein the thickness of the layers is no greater than a wavelength of interested. The layers may be formed of different materials having different refractive indices, for example. In this type of metamaterial, the thickness of the layers is sub-wavelength. That is, the sub-wavelength structural feature determining the electromagnetic properties of the multilayer structure is the thickness of the layers. An example of this type of metamaterial is a Bragg structure such as a Bragg reflector or Bragg mirror. While each layer is formed from a conventional material, the exact refractive index values and their thicknesses can be tuned to obtain light filtering in the same way as a metamaterial structure comprising sub-wavelength metaelements or meta-atoms. i.e. a phenomenon that is obtained via the design of the multilayer structure and not via the individual material properties.

There is provided metamaterials comprising a plurality of structural features having sub-wavelength dimensions. In embodiments the sub-wavelength structural features are the meta-atoms (e.g. nanoparticles with a sub-wavelength diameter) and, in other embodiments, the structural features are the respective thicknesses of dielectric layers in a Bragg reflector.

According to an embodiment, in which the filter comprises a film comprising metamaterial elements (or nanoparticles), the metamaterial elements (or nanoparticles) in the filter are arranged in unit cells, wherein each unit cell includes one nanoparticle and a surrounding host medium.

The metamaterial nanoparticles inside the unit cells—the structural elements—are made from silver, gold and/or alumina, or any other metal that supports plasmonic resonances in optical frequencies. They can have spherical, cubical, cylindrical, ellipsoidal, or rod-like shapes and nanoscale sizes, for example, between 1-50 nm. The host medium is a conventional low-loss dielectric with relative permittivity up to 5. It serves as a supporting structure for the nanoparticles as well as being a tunable parameter for the strength and frequency of the resonances. This means that by choosing the proper host material, with appropriately selected physical properties such as density, thickness, geometry, and so on, the optical properties of the whole filter can be controlled accordingly.

Optionally, the filter may comprise both sub-wavelength thick dielectric layers and layers of meta-atoms. That is, in another embodiment, the filter comprises multiple layers of nanoparticle arrays, with each array/layer consisting of a different arrangement of nanoparticles. For example, each layer may have a different host medium, or differently sized nanoparticles, or nanoparticles spaced at different distances apart. In addition, some of the layers between the nanoparticle arrays may be Bragg-type structures, i.e. alternating dielectric layers without any nanoparticles present. This is a fusion structure that offers the bandgap performance of the Bragg reflectors with the isotropic filtering response of nanoparticle absorption.

In order to construct a metamaterial structure comprising metaelements, the unit cells of metaelements are arranged in a layer in a periodic fashion in at least 2 dimensions, preferably in 3 dimensions (x,y,z). Each metamaterial layer can be much shorter in the third dimension (z) than in the first two dimensions (x,y). Layers with different respective electromagnetic properties can be stacked on top of each other in the third dimension to achieve multiband performance of the filter. Non-metamaterial layers can also be added at the top and/or bottom of the stacked Metamaterial layers to provide the system with adhesive properties, scratch resistance structural strength and/or temperature isolation.

As mentioned above, the filter can be designed and manufactured to filter out one or more selected narrow bands of laser wavelength. The physical properties of the structural elements of the metamaterial, such as the size and shape of the nanoparticles and their surrounding medium or the relative thicknesses and refractive indices of the layers, can be selected according to the desired filtration wavelengths for a particular film. In particular, the metamaterial nanoparticles, or Bragg-type layers, can be selected and tuned in order to provide particular desired values of electric permittivity and magnetic permeability, which are the electromagnetic properties that will determine how the film treats electromagnetic radiation passing therethrough.

FIG. 1 shows a possible implementation of a thin film filter 10, comprising metaelements, onto an aircraft cockpit. The filter 10 comprises a protective layer 12, a metamaterial layer 14, and an adhesive layer 16 which is applied directly to the inside of the cockpit window 18. In this example the nanoparticles 22 are provided in an array 20 of nanospheres 24 made from silver.

As can be seen in FIG. 1, the array 20 of nanoparticles 22 make up the layer 14 within the filter 10. The layer 14 may be a single metamaterial, with the nanoparticles 22 within the array 20 arranged to block out a single narrow band of electromagnetic frequencies, or alternatively the layer 14 can comprise several metamaterials stacked together, wherein each metamaterial blocks out a different respective band of electromagnetic frequencies.

The protective layer 12 is formed over the layer, to act as a barrier when the filter 10 is applied to the inside of a cockpit window, or to another surface. The protective layer 12 may add to the structural strength of the filter 10 and/or may have anti-scratch properties to minimise damage to the filter 10 during use.

The adhesive layer 16 is provided on the other side of the layer 14, to enable it to be applied to a cockpit window or other surface. The adhesive layer 16 and protective layer 12 should both be optically transparent, so as not to distort the transmission of electromagentic radiation through the filter.

Figure 2A:
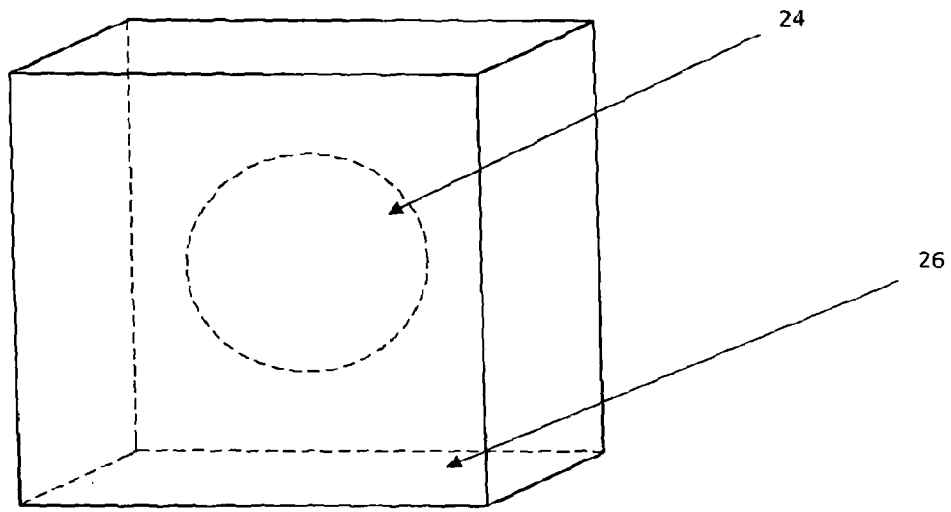
FIG. 2a shows a unit cell for a metamaterial filter, which comprises a plasmonic spherical nanoparticle surrounded by a homogenous dielectric host medium.
Figure 2B:
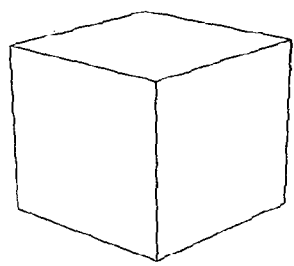
FIG. 2b shows an alternative nanoparticle for the unit cell shown in FIG. 2a, the nanoparticle having a cubic shape.
Figure 2C:
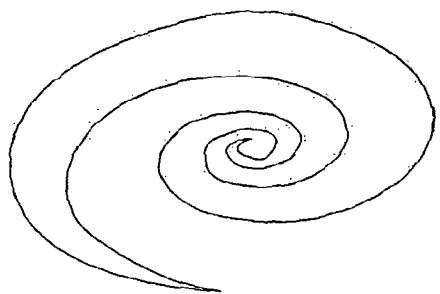
FIG. 2c shows another alternative nanoparticle shape, comprising a helix or swirl.
Figure 2D:
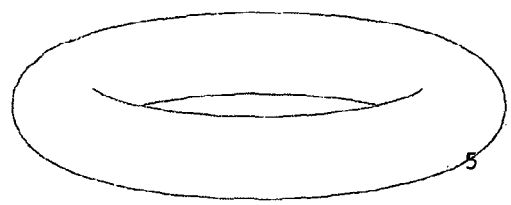
FIG. 2d shows another alternative nanoparticle shape, comprising an annulus.
Figure 2E:
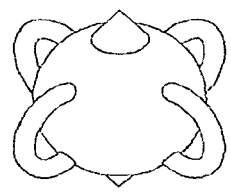
FIG. 2e shows another alternative nanoparticle shape, comprising a sphere with first and second conical projections at the top and bottom and four semi-annuli around the sides.
Figure 2F:
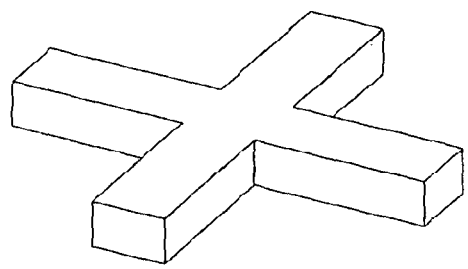
FIG. 2f shows another alternative nanoparticle shape comprising a three-dimensional cross or X shape.
Figure 2G:
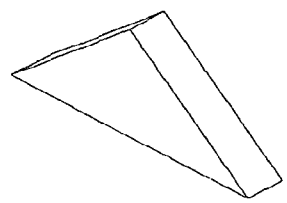
FIG. 2g shows another alternative nanoparticle shape having a triangular cross section.

FIG. 2a shows a unit cell comprising a nanoparticle 22 within the metamaterial layer 14 at a higher level of magnification. The nanoparticle 22 comprises a metallic sphere 24 at its centre surrounded by a dielectric medium 26. FIGS. 2b to 2g show alternative shapes for the metamaterial element at the centre of the unit cell. The shape chosen can depend on the required use for the filter, or on any appropriate criteria as will be known to the skilled reader.

Figure 3:
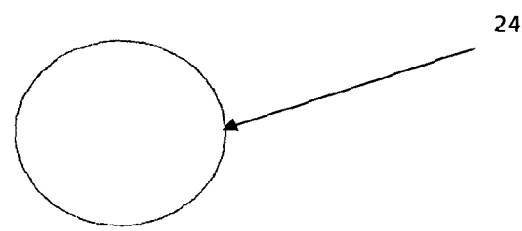
FIG. 3 shows a simulation of the electric field distribution on a surface of the nanoparticle in FIG. 2.

FIG. 3 shows a simulation of the electric field distribution on the surface of the silver sphere 24, which is part of a periodic array 20 in two dimensions shown in FIG. 1, for an incoming electromagnetic wave with a frequency equal to the resonant frequency of the sphere 24, after steady state is reached. The wave propagates in-plane, i.e. along the surface of the periodicity. For a single spherical metallic particle such as the one shown in FIG. 2a, the field amplitude A is found by:

$$4\pi\alpha^3 \frac{\varepsilon - \varepsilon_m}{\varepsilon + 2\varepsilon_m}, \quad (1)$$

where $\alpha$ is the sphere radius and $\varepsilon_m$ is the relative permittivity of the host medium which can be assumed constant with frequency and to have a value higher than one, i.e. a conventional material permittivity.

The permittivity of a the sphere 24 is denoted as $\varepsilon(\omega)$ and is usually negative at optical frequencies. It strongly depends on the wave frequency $\omega$, typically having a Drude-type dependence. For a given material, $\varepsilon(\omega)$ is fixed and the location of the resonance in frequency can be adjusted by tuning the background permittivity. In this example, the point at which the resonance, and hence maximum absorption, occurs is the frequency $\omega_0$ for which:

$$\varepsilon(\omega_0) = -2\varepsilon_m. \quad (2)$$

Figure 4A:
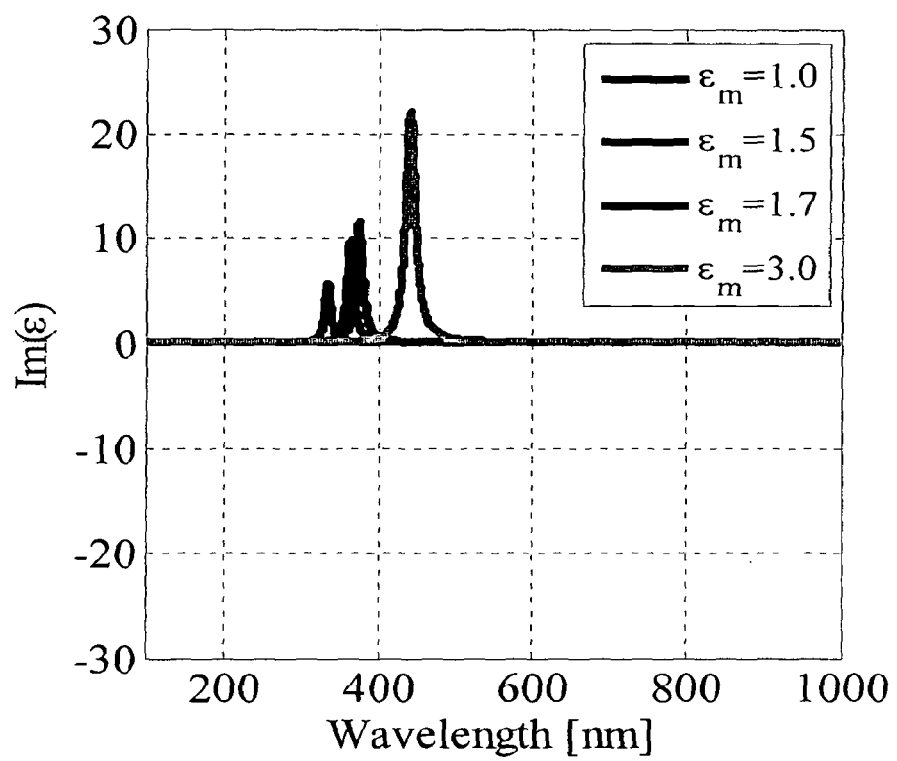
FIG. 4a shows the relationship between the imaginary part of the macroscopic permittivity of the nanoparticle of FIG. 2 and the background permittivity of the host medium.

FIG. 4a shows how the imaginary part of the macroscopic permittivity of the array 20 of silver nanoparticles in FIG. 1 is shifted based on the background permittivity of the host medium 26.

Figure 4B:
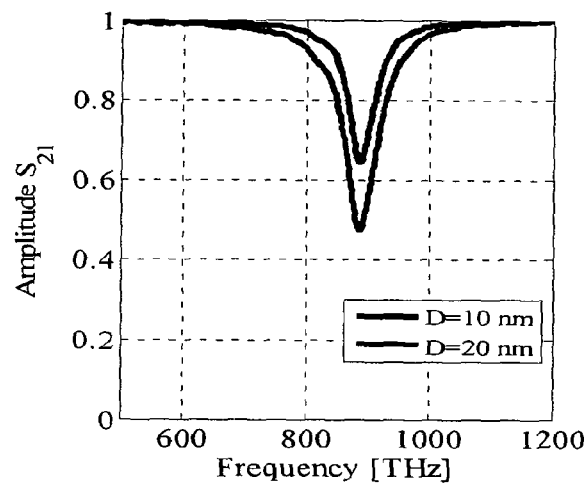
FIG. 4b shows the effect of the diameter (D) of the spherical nanoparticle on the strength of absorption of electromagnetic radiation at a particular frequency.
Figure 5A:
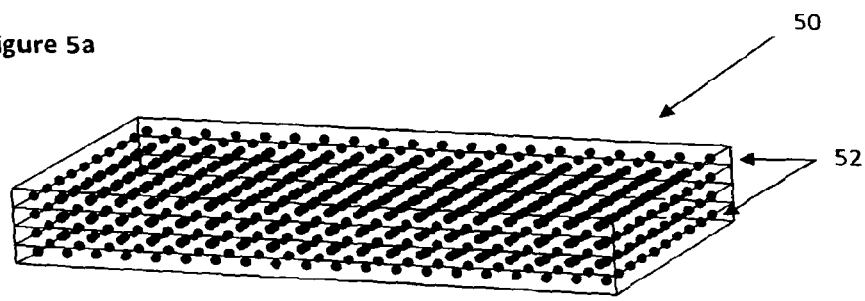
FIG. 5a shows a metamaterial filter comprising layers of spherical nanoparticles wherein the two dimensional period of the nanoparticles is 30 nm.
Figure 5B:
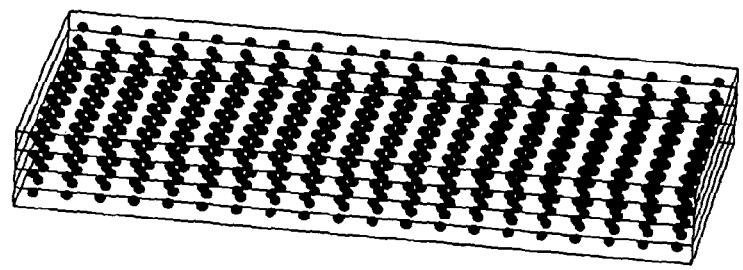
FIG. 5b shows a filter as shown in FIG. 5a but with a two dimensional period of 45 nm.
Figure 5C:
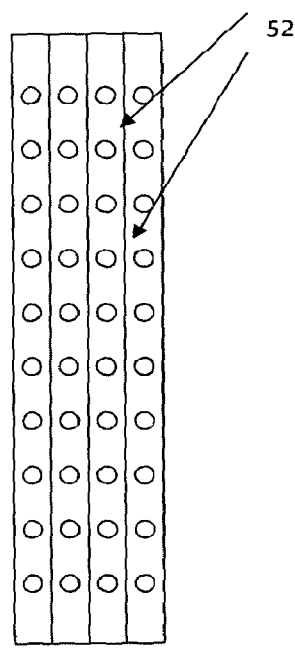
Figure 5D:
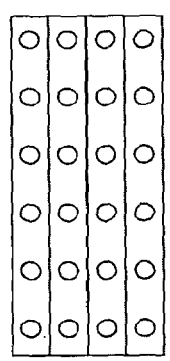
FIG. 5d shows a side view of the filter of FIG. 5b.

FIG. 4b shows that the strength of the absorption of an electromagnetic wave by the array 20 can be controlled by using nanospheres of a slightly different size. In this example, the doubling of the sphere 24 diameter (D) increases absorption by approximately 40%.

The permittivity and permeability of a metamaterial layer or layers can be extracted from the reflection and transmission coefficients of light incident on the metamaterial. These can be evaluated either experimentally or via simulations of the metamaterial layers. Assuming a metamaterial of thickness d, and that the incident light has a wavevector k, the permittivity and permeability function are found from the equations:

$$\varepsilon = \frac{n}{Z} \qquad (4)$$

$$\mu = nZ$$

$$Z = \pm \sqrt{\frac{(1+r)^2 - t'^2}{(1-r)^2 - t'^2}} \qquad (5)$$

$$\text{Re}\{n\} = \pm \text{Re}\left\{\frac{\cos^{-1}\left(\frac{1}{2t'}[1-(r^2-t'^2)]\right)}{kd}\right\} + \frac{2\pi m}{kd}$$

$$\text{Im}\{n\} = \text{Im}\left\{\frac{\cos^{-1}\left(\frac{1}{2t'}[1-(r^2-t'^2)]\right)}{kd}\right\} + \frac{2\pi m}{kd} \qquad (6)$$

Herein is the effective index of refraction, Z the impedance of the metamaterial, m an integer that depends on the thickness of the metamaterial, r the reflection coefficient, and $$t' = t \cdot e^{ikd} \qquad (7)$$

the normalized reflection coefficient. "Re" indicates the real part of the effective index and "Im" indicates the imaginary part.

FIGS. 5*a* to 5*d* show examples of a metamaterial-based filter 50 consisting of spherical nanoparticles. The nanoparticles are periodically arranged in a 2-dimensional plane on a rectangular or square lattice. Different layers of nanoparticles are then stacked together along the propagation direction of the laser (i.e. the 'z' direction). Each layer 52 may include a different background host medium that has a different respective permittivity. Each layer here shows about 200 particles, and this is potentially only a small section of the total surface of the filter 50 which normally would extend much longer along each direction. In addition, the nanoparticles can have a different shape other than spherical. Some examples of possible nanoparticle shapes are shown in FIGS. 2*a* to 2*g*.

According to another embodiment an optical filter is provided in the form of a film comprising stacked layers of photonic crystals.

Photonic crystals can be considered as a special case of metamaterials. They are periodic arrangements of optical nanostructures, typically consisting of dielectric or metallo-dielectric materials, for example in the form of rods, and a surrounding medium. The photonic crystal unit cells are usually of the same size or slightly smaller than the wavelength of electromagnetic radiation they operate at. While some photonic crystals have been found in nature, they have been studied extensively since the 1980s when it became possible to fabricate them experimentally.

The photonic crystal filter operates by controlling the band gaps that arise from the periodicity of the lattice that is formed when the unit cell is repeated periodically. The exact frequencies of absorption are tuned by adjusting the period of the lattice and the cross-sectional size of the rods. The bandwidth of the absorption at the frequencies of interest is tuned by the index contrast, i.e. the ratio between the refractive index of the rods and the refractive index of the surrounding medium. The strength of the absorption is controlled by increasing the thickness of the photonic crystal lattice, in the third (z) dimension.

The unit cell for each layer of photonic crystals in the filter is square or hexagonal (honeycomb) and consists of a central dielectric rod surrounded by air. The rod can have a square, cylindrical, or other cross section. The rod has a typical relative permittivity of approximately 10 (e.g. achieved using GaAs material) and a typical radius of around 0.2*α, where α is the period of the layer. The unit cell is thus repeated periodically in 2 dimensions (perpendicular to the axis of the rods) with period α. In the third dimension, multiple identical layers can be stacked or different layers can be stacked to achieve absorption for multiple frequencies and for multiple polarisations.

As mentioned above, according to another embodiment a filter comprising a film is provided. The film comprises a stratified medium that can be fabricated for example via spin coating of polymer materials, to assemble a Bragg structure such a Bragg reflector or Bragg mirror. It consists of periodically alternating layers of two or more materials with sub-wavelength thickness, such as nanometer-scale thickness for optical wavelengths. Each layer of the film causes a partial reflection of an incoming electromagnetic wave of a certain frequency. When the optical thickness of the mirror is at least five times longer than the wavelength of an incoming electromagnetic wave of a particular frequency, constructive interference occurs and a narrow range of wavelengths around the incoming frequency is reflected.

Figure 6:
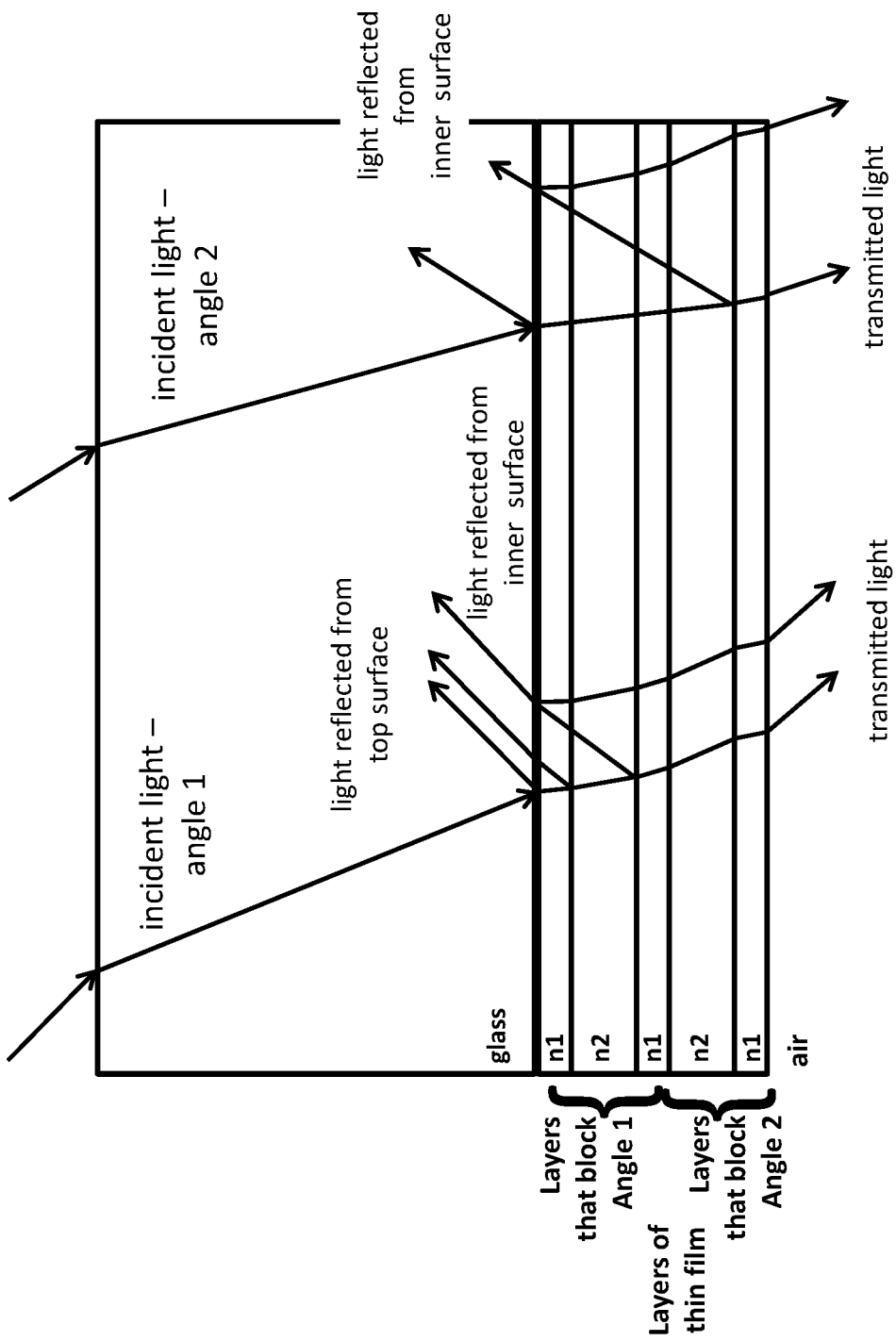
FIG. 6 shows Bragg reflection geometry for a Bragg Mirror filter having layers of first and second materials with first and second respective refractive indices.

FIG. 6 shows the light ray paths of incident light onto a Bragg mirror 60.

The Bragg Mirror 60 made from a multi-layer system composed of layers with respective refractive indices $n_1$ and $n_2$. The refractive indices are alternated in layers in the z dimension of the three dimensional film. The structure is periodic along the axis with a period "p" as shown in FIG. 6. This period is also known as the "pitch" of the film. The film structure acts as a reflector at a single frequency with a finite bandwidth. The values of the refractive indices $n_1$ and $n_2$ are around 1.5. Their contrast (or ratio) controls the bandwidth of the reflection provided by the film. Typical index contrast is 1.7/1.5 which yields a bandwidth of ~2-5%. The magnitude of the reflectivity is controlled by the total length of the structure, in the direction of the propagating laser radiation, while the pitch and the absolute values of the indices control the exact frequencies of interest. By stacking multiple sets of Bragg mirrors, multiband operation can be achieved.

The reflectivity R of the Bragg Mirror 60 is given approximately by the equation $$R = \left[\frac{n_o(n_2)^{2N} - n_s(n_1)^{2N}}{n_o(n_2)^{2N} + n_s(n_1)^{2N}}\right], \qquad (8)$$

Here $n_1$ and $n_2$ are the refractive indices of two alternating materials within the Bragg mirror 60, while $n_o$ and $n_s$ are the refractive indices of the originating medium and the terminating medium respectively. If the film is applied to the inside of a transparent glass surface as shown in FIG. 6, the originating medium will be glass and the terminating medium will be air. N is the number of periodic layers comprising the mirror 60.

The bandwidth $\Delta\lambda$ of the Bragg Mirror 60 is given by $$\Delta\lambda_0 = \frac{4\lambda_o}{\pi}\arcsin\left(\frac{n_2 - n_1}{n_2 + n_1}\right), \qquad (9)$$

Here $\lambda_0$ is the central wavelength of the reflected radiation and $n_1$ and $n_2$ are the alternating refractive indices of the Bragg layers as before. In order to increase the reflectivity of the Bragg Mirror 60 the number of layers can be increased, while the bandwidth of operation can be made narrower by decreasing the index contrast.

Figure 7:
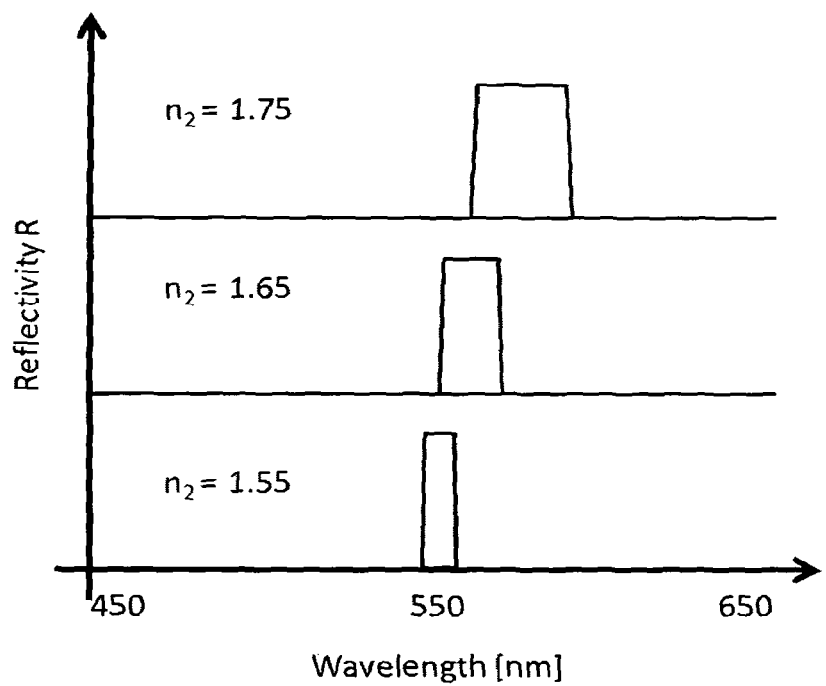
FIG. 7 shows the relationship between the refractive index $n_2$ of the second material in the Bragg Mirror of FIG. 6 to the wavelength of electromagnetic radiation which is reflected by the Bragg Mirror.

An example of the reflectivity of the Bragg Mirror 60 as a function of wavelength for various refractive index contrasts is shown in FIG. 7. Here the index of the first layer of each pair is constant at 1.50, and the index of the second layer of each successive pair is varied.

In an advantageous embodiment, a filter is provide to filter light omnidirectionally, i.e. over a wide range of angles. This is a serious limitation of conventional Bragg mirrors which operate over a very narrow range of angles. In embodiments, this is achieved by combining two or more metamaterials. For example: a first metamaterial may reflect a first wavelength of radiation received at a first angle; a second metamaterial may reflect the first wavelength received at a second angle; and a third metamaterial may reflect the first wavelength received at a third angle. By combining three such metamaterials, a pseudo broad-angle filter is provided for incident radiation at the first wavelength.

In a further embodiment, the metamaterial is designed to be omnidirectional and/or block multiple wavelengths of light. In an example, target wavelengths green (532 nm), blue (445 nm), and red (635 nm) require a bandgap in the order of 5-10 nm around each wavelength in order to preserve the overall transparency of the filters. However, the filters can be tuned to operate on other wavelength as well, by adjusting the thickness and refractive indexes of the layers. The multi-wavelength and/or multi-angle operation of the structure is achieved by specifically designing the structure, such as a photonic crystal mirror structure, to consist of multiple sub-mirrors, each mirror operating for a specific wavelength range and a specific range of angles (typically +/−30 degrees). That is, in an example, there is provided three sub-mirrors for each wavelength in order to cover all angles of incidence, which will be stacked together for omnidirectional performance. In embodiments, high index materials such as $MoO_3$ and $TiO_2$ are used since the omnidirectional performance is enhanced with increased index. In yet further embodiments, further layers are added after these multiple stacked layers in order to enhance the transmission of light outside the multiple bandgaps. For example, a three (or more) layer anti-reflection coating may be added to optimize transmission.

Accordingly, there is provided a filter comprising a first metamaterial arranged to provide first filtering and a second metamaterial arranged to provide second filtering. The first/second filtering may be wavelength-dependent filtering and/or angle of incidence dependent filtering. By overlapping the performance of metamaterials, pseudo omnidirectional filtering may be provided. Equally, multiband filtering may be provided.

According to another embodiment, an optical filter comprises a film which utilizes cholesteric liquid crystals. Liquid crystals are a state of matter between a liquid and a crystal. The molecules in liquid crystals can flow slowly, as in a liquid, but at the same time they maintain a preferable orientation, as in a crystal. Liquid crystals are routinely used in displays and monitors, as they can be electrically controlled to block or transmit a certain polarization of light.

Figure 8:
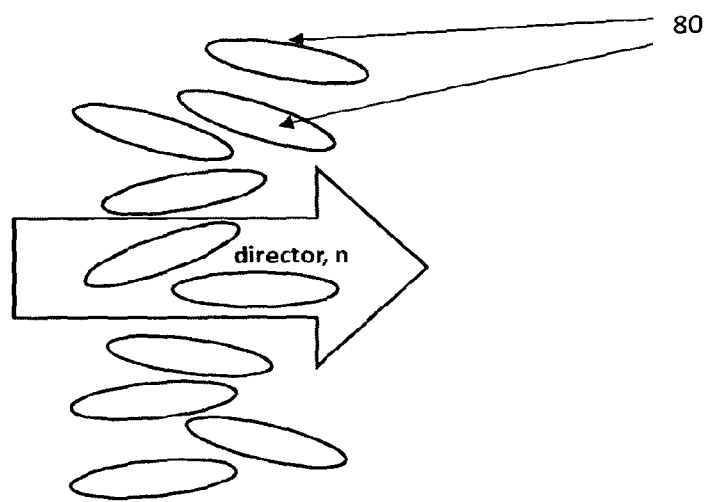
FIG. 8 shows a plurality of cholesteric liquid crystals and the orientation of their director field.

Liquid crystals are inherently anisotropic and can be described by the orientation of their director field, i.e. the preferred axis along which the elongated molecules 80 of a liquid crystal are oriented on average, as shown in FIG. 8. The axis orientation is usually defined through the "director" n, a dimensionless unit vector.

Of specific interest here are the cholesteric liquid crystals, i.e. liquid crystals for which the director field (their molecule axis orientation) rotates as a function of space in one dimension.

If that dimension is along the z-axis, the director n is a function of z, i.e. n=n(z). Therefore the liquid crystals form a helical structure. The pitch of the helical structure for each liquid crystal is determined by the distance between the start and end points of the crystal along said dimension when it rotates 360 degrees.

Figure 9A:
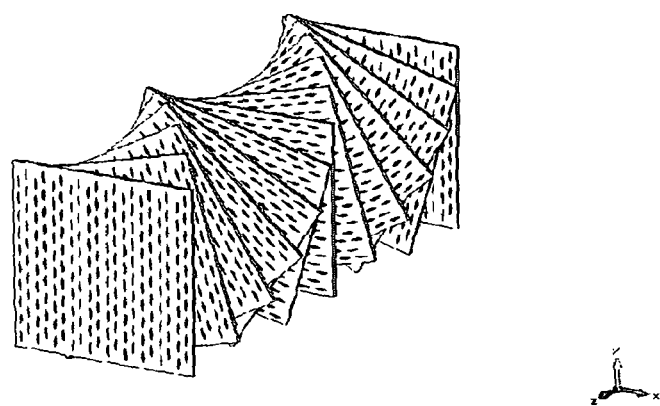
FIG. 9a shows a cholesteric crystal being rotated 180 degrees along a propagation axis.
Figure 9B:
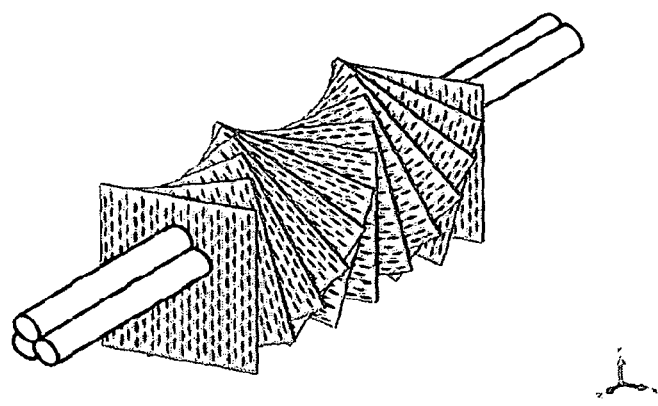
FIG. 9b shows the crystal of FIG. 9a with incident light comprising three different electromagnetic frequencies incident on the crystal in the propagation direction.

FIGS. 9a and 9b show an example of a cholesteric liquid crystal which has rotated 180 degrees. Therefore the difference between the start and end positions of the crystal in FIGS. 9a and 9b is the half pitch of the crystal. For an optical filter which filters out one or more narrow bands of laser light, the typical pitch (p) of the helical structure should be between 100 and 1000 nanometers (nm).

The exact director orientation for a crystal with respect to the laboratory frame can be determined through rotating the director by an angle $$\varphi = \frac{2\pi z}{p}, \tag{10}$$

which varies as function of the propagating distance z of the electromagnetic wave. If the permittivity tensor at the origin of the liquid crystal has the form $$\varepsilon = \begin{pmatrix} n_e^2 & 0 & 0 \\ 0 & n_o^2 & 0 \\ 0 & 0 & n_o^2 \end{pmatrix} \tag{11}$$

Then the permittivity after the wave has propagated a distance z along the crystal is $$\varepsilon(z) = \begin{pmatrix} \bar{\varepsilon} + \Delta\varepsilon\cos\left(\frac{4\pi z}{p}\right) & \Delta\varepsilon\sin\left(\frac{4\pi z}{p}\right) & 0 \\ \Delta\varepsilon\sin\left(\frac{4\pi z}{p}\right) & \bar{\varepsilon} - \Delta\varepsilon\cos\left(\frac{4\pi z}{p}\right) & 0 \\ 0 & 0 & n_o^2 \end{pmatrix} \tag{12}$$

Here $\bar{\varepsilon} = \frac{n_o^2 + n_e^2}{2}$ and $\Delta\varepsilon = \frac{n_e^2 - n_o^2}{2}$ In FIGS. 9a and 9b the director is rotating inside the x-y plane while the crystal evolves (and so has a pitch) in the z direction.

FIG. 9a shows a cholesteric liquid crystal structure. The liquid crystals (depicted as dark coloured ellipsoidal elements) rotate around the (z) axis of propagation which coincides with the axis of the helix. In FIG. 9b, white light illumination of multiple wavelengths is shown incident on the structure along its rotation axis (depicted z-axis). In this example the green light is filtered out whilst other light wavelengths are allowed through the crystal structure.

Figure 10:
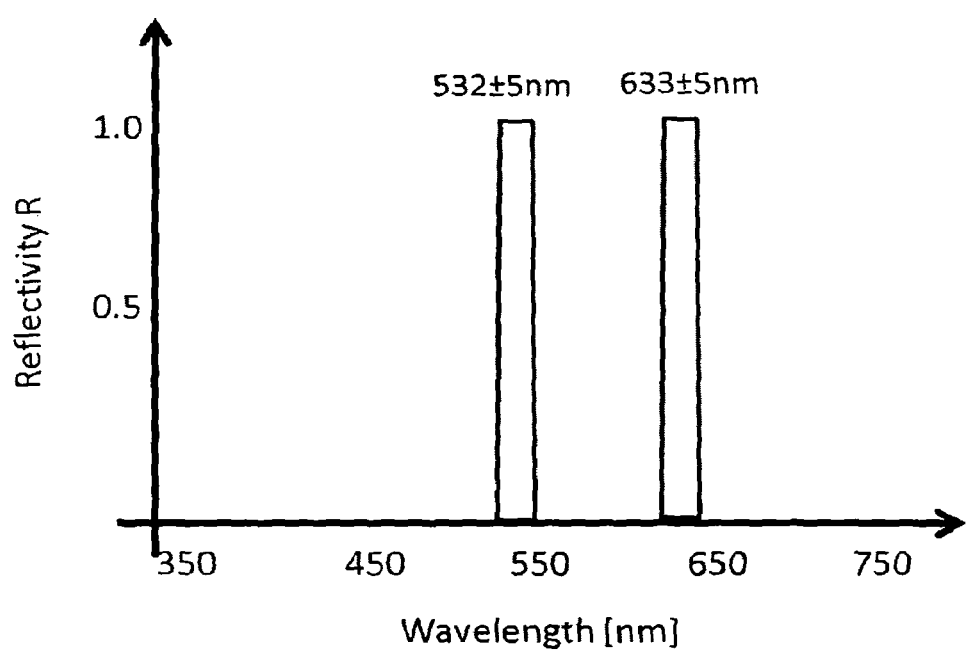
FIG. 10 shows reflectivity levels achieved by a filter having first and second layers of cholesteric liquid crystals which reflect first and second respective frequencies of electromagnetic radiation.

In order to form an optical filter from cholesteric liquid crystals, the helical structure is repeated several times (~5-10 or more) along the axis of the helix, which also coincides with the main direction propagation of the laser, in FIG. 9b. Polarized fields of electromagnetic radiation impinging on the structure will be reflected at a specific frequency depending on the value of the pitch. The strength of the reflection is controlled by the number of times the pitch is repeated (the total length of the helix). By stacking multiple layers of liquid crystals with different pitches together, multiple frequencies and multiple polarizations can be reflected, as shown in the FIG. 10, wherein two different layers, each with reflectively (R) of around 1, are shown to reflect electromagnetic radiation at two different respective frequencies.

Therefore in each of the embodiments described above a film is provided which can comprise multiple stacked layers of material elements such as unit cells or crystals, wherein the shape, composition or arrangement of those material elements can be deliberately designed to alter the behaviour of the film in order to filter out certain chosen wavelengths of electromagnetic radiation such as laser light but to allow other wavelengths through the film without any distortion. The filter can comprise nanoparticles, a Bragg reflector, and/or liquid crystals. Multiple metamaterial layers having different respective filtering capabilities can be stacked together to form a film, therefore allowing more than one band of wavelengths to be filtered out by the film or omnidirectional filtering to be achieved. Alternatively the filter could contain multiple metamaterials which each have the same electromagnetic properties such that the film is designed only to filter out one band of wavelengths.

In each embodiment described above the filter is provided as a result of engineering materials at the nanoscale. As the skilled reader will know, the wavelength of visible light is around 500 nm. In order to provide a light-manipulating material that can filter out certain chosen frequencies of laser or other light or electromagnetic radiation, structural elements, such as material elements, smaller than (or, at most, the same size as) the wavelength of the radiation should be provided. In the solution provided herein those material elements are preferably of the order of 1 to 100 nm in size.

Multiple metamaterials formed from the above described structural elements can be stacked or otherwise combined together in a number of different ways. For example physical vapour deposition, sputter deposition, polymer implantation, chemical vapour deposition or spin coating of layers may be used. The spin coating method, as an example, consists of four different stages. First, the material (e.g. the polymer) is poured on a flat surface or substrate through a nozzle. Second, the surface starts rotating fast, accelerating to a final speed. Third, while the surface is rotating, the material is spread evenly across the surface area, dominated by centrifugal and viscous forces. Finally, a solvent is applied on top of the spinning material, in order to adjust is thickness down to the required value. The process is repeated for each layer of the filter.

In an embodiment, a metamaterial is fabricated by a sol-gel process. That is, another method to fabricate a Bragg-based metamaterial is sol-gel. Sol-gel is an elegant, low cost, and powerful approach which offers innovative strategies to tailor nanostructured films with controllable properties including size distribution, morphology, porosity, shape, and surface area. It is a chemical method that also provides an alternative route to the synthesis of multi component oxide materials with different compositions and where the distribution of heterometal bonds is highly homogeneous. Sol-gel is a unique technology that allows the choice of thickness and refractive index of the thin film layer by simply changing synthetic conditions including the chemical composition of the precursors, the addition of additives, the concentrations, the dip coating angle and speed, etc. Sol-gel technology allows the fabrication of thin film coatings on various substrates with different sizes and shapes. To create our device, which typically consists of alternating layers of two different materials (with different refractive indexes), two mixtures are prepared that have the corresponding refractive indexes necessary for light blocking based on the Bragg design. Then, a layer of one of the two mixtures is deposited on a substrate (which may be a transparent flexible substrate), then it is dried or baked until is solidifies. Subsequently, the second layer is deposited and then dried until it solidifies. The procedure repeats until the necessary number of layers is reached, which may be more than 100. At the end of the process further layers (using new mixtures with different refractive indexes than the original two) may be added, in order to provide scratch protection and/or anti-reflection coatings to optimize transmission.

Another method for fabricating the filter is nanoparticle self-assembly. Self-assembly is a "bottom-up" approach where the nanoparticles are simply placed on a specially prepared surface and automatically arrange themselves based on the electrochemical interactions between the particles and the surface. This method has the advantage that it can be much simpler and quicker than placing nanoparticles in the film by manipulating them individually. The preparation of the surface for self-assembly can be achieved using a variety of techniques, such as dip-pen lithography, laser lithography, electron beam lithography, and chemical lithography.

By combining multiple differently-tuned thin metamaterials together, protection from lasers at multiple different wavelengths of light can be simultaneously achieved using the same filter. Furthermore, the filtration can be extended to other laser frequencies beyond the visible spectrum such as ultraviolet lasers. As mentioned above, the filter operates passively and there is no intervention from the user required in order to select which frequency or frequencies of radiation are to be filtered out at any given time. Instead, the filter will immediately react to incoming electromagnetic radiation by filtering out any components of that radiation that are within one or more of the bands of wavelength that the filter has been predesigned to attenuate. It will allow any other components within the radiation, which are not within those bands of wavelengths, to pass through the film without being changed or distorted in terms of frequency, wavelength, angle or any other property.

However, the inventors have found that simple combining, such as stacking, of independently-designed metamaterials, such as Bragg reflectors, does not give rise to optimal multiband or multi-angle performance. That is, the performance of a combined metamaterial device does not merely amount to the sum of the parts. More specifically, the inventors have found that the overall filtering efficiency is reduced by combining metamaterials because the layers of one metamaterial affect the electromagnetic behaviour of the other metamaterial or metamaterials in the combination. Accordingly, in embodiments, there is provided a method of forming an improved filter comprising a plurality of metamaterials, the method comprising altering the sub-wavelength properties of the respective metamaterials to provide improved multiband performance. Likewise, in embodiments, there is provided a method of forming an improved filter comprising a plurality of metamaterials, the method comprising altering the sub-wavelength properties of the respective metamaterials to provide improved multi-angle performance. There is therefore provided an improved angle-invariant, or omnidirectional, filter. The method may result in deterioration of the single-band or single-angle performance of each metamaterial when used alone. Such multiband/multi-angle optimisation may be achieved experimentally or theoretically by monitoring the optical properties of the combined device at, for example, multiple wavelengths and/or multiple angles of incidence whilst adjusting the sub-wavelength parameters of the metamaterials. For example, optimisation may be achieved using an optimisation algorithm. Accordingly, a first metamaterial may predominately provide first filtering characteristics, and a second metamaterial may predominantly provide second filtering characteristics, and the method comprises changing the sub-wavelength properties of the first metamaterial in view of the first and second filtering characteristics, not just the first filtering characteristics. The inventors have found that using this approach, a yet further improved multiband and/or multi-angle filter may be provided.

The filter can provide filtration of radiation from lasers up to and including Class 3B lasers, which have rated powers up to 500 milliWatts. It also provides protection for many Class 4 lasers with rated powers up to 2 Watts and could be used to protect from stronger lasers in future. As indicated in the background section above, a one Watt laser is the highest power commonly available laser currently however this could change over time and the filter as described herein is equipped to accommodate such changes.

The filter can attenuate laser light or other electromagnetic radiation which is shone directly at the filter and it can also filter out specular reflections. This is important as even specular reflections can cause immediate severe eye damage to one or more parts of the eye including the cornea, the iris, the lens or even the retina. Lasers can also cause distraction, glare or temporary flash blindness, all of which are uncomfortable and are potentially very dangerous if the person affected is operating a vehicle, aircraft or piece of machinery at the time, even if the eye damage is not permanent. The filter described herein acts to eliminate the safety hazard posed by lasers and their potential damage to the eyes and skin of individuals.

As an example, a 5 mW green laser pointer seen from 3,000 feet away corresponds to an intensity of 0.5 $\mu W/cm^2$ causing significant distraction. The same intensity is achieved from a 300 mW laser as seen from 16,000 feet away. An intensity level of 50 $\mu W/cm^2$ can temporarily blind a person, while laser intensities on the order of 1 $mW/cm^2$ or more have severe physical effects. These effects occur even when the laser beam travels through thin air, which refracts light less, such that the laser beam cannot be seen by the human eye.

Laser beam sizes can diverge, and unsteady hands holding a laser can turn a pointer laser beam into a camera-like flash when viewed from a distance.

The wavelengths for which such phenomena are stronger are the ultraviolet (200-390 nm), the visible (390-750 nm) and the infrared (750 nm-1 mm). Lasers exist for all these sections of the electromagnetic spectrum, such as the He—Ne (Helium-Neon) at 632.8 nm, the Nd:Yag (Neodymium-doped yttrium aluminium garnet) at 946 nm, or the third harmonic of titanium-sapphire between 235-330 nm. Of particular relevance to the filter described herein are lasers that emit radiation in the visible part of the spectrum because that is the spectrum where the human eyes are most sensitive, and where most readily available inexpensive lasers on the market operate. For example, one of the most commonly used lasers is the frequency-doubled Nd:YAG at 532 nm (green laser), which is near the peak of the human photopic sensitivity.

The filter described herein can be specifically tuned to filter out the wavelengths at which the most commonly used laser products are known to operate. Due to the sensitivity of the nanoparticle structure, and the accuracy to which the particles can be tuned, the filter can comprise extremely narrow band elements which selectively block specific wavelengths of light without affecting other frequencies, resulting in up to almost complete transparency for the user behind the filter. Regardless of the physical form in which the filter is provided, it does not have to be tinted or coloured and so its presence leads to minimal distortion of the user's vision (<10%).

Although a film has been described hereabove, the filter can be provided in a plurality of different physical forms whilst still being composed of one or more layers of nanoparticle structure as described in detail herein. The filter can applied to flat or curved windows in buildings or laser equipped facilities, or to any of: transparent acrylic boxes used for protection from laser light, goggles, eye shields, contact lenses, protective gloves, vehicle windows, windscreens and aircraft cockpits. As well as or instead of being a safety device, the filter could be used for aesthetic or entertainment purposes to deliberately filter out specific components of light from walls, displays or pictures. Such filtration could be controlled by a user for instantly viewable results.

Although the filter has been described hereabove as being passive, if it was sufficiently small in size it could be electronically controlled whilst still having only low energy consumption requirements. By imposing static low energy electric fields, the nanoparticles can have different properties and the filtering action can be tuned and detuned on demand. A field can be applied using transparent conducting films (made from organic or inorganic materials, such as silver oxide, carbon nanotubes or graphene) and an external battery source. This is useful in situations for which it might be desired not to block any light at all, during certain periods of time. Furthermore, the system can be tuned ahead of time to operate at different wavelengths of light other than the visible, such as infrared and ultraviolet. Multiband operation could also be achieved over those spectral regions.

Although particular embodiments and aspects have been described above, variations can be made without departing from the inventive concepts disclosed herein. The filter can block out any one or more wavelengths or narrow bands of wavelengths in the EM spectrum. The filter can comprise any appropriate number of layers. The filter and/or an individual layer within the filter may comprise a combination of different types of material elements. It may comprise an adhesive or other means for attachment to a surface. The material elements or unit cells within the filter layers can be solid or include a cavity or perforation, which may include an air bubble.

The filter is entirely scalable so can be manufactured to fit any size and shape of surface. It may be applied to some or all of a surface. It may be replaced over time with a different filter if the filtration requirements for a surface change. And it may be tuned before use by the selection and arrangement of appropriate material elements in one or more layers to provide filtration at any desired wavelength or wavelengths.

Therefore an efficient and highly useful solution is provided. It can be manufactured relatively cost-effectively and can be used in many different practical situations. It enhances user safety, protecting against laser damage, and can also provide filtration and electromagnetic concealment for a wide range of applications.

There is provided a filter for filtering electromagnetic radiation, wherein said filter is arranged to transmit electromagnetic radiation of a first predetermined wavelength and to block transmission of electromagnetic radiation of a second, different predetermined wavelength; said filter comprising a first layer formed of a plurality of material elements, wherein each material element is at least one-dimensional and the size of the material element along each dimension is no greater than the size of the second predetermined wavelength.

The second predetermined wavelength may be in the visible part of the electromagnetic spectrum. The filter may further comprises an adhesive layer. A size of the material element along each dimension may be less than the size of the second predetermined wavelength. The material elements may be nanoscale elements. Each material element may have a size along each dimension of between 1 nanometre (nm) and 100 nanometres (nm).

The filter may be arranged to be optically transparent to electromagnetic radiation of all wavelengths except the wavelength or wavelengths which it is specifically arranged to block transmission of. The filter may be substantially transparent to the human eye.

The invention claimed is:

1. A method of fabricating a filter for filtering ultraviolet to infrared electromagnetic radiation, said filter combining:
a first metamaterial having sub-wavelength properties and arranged to provide first filtering of electromagnetic radiation incident at a first angle in a first range of angles; and
a second metamaterial having sub-wavelength properties and arranged to provide second filtering of electromagnetic radiation at a second angle in a second range of angles, wherein the first and second angles are different and the first and second ranges of angles partially overlap and wherein the first metamaterial and second metamaterial are configured as stacked layers of the filter,
wherein the first filtering comprises blocking electromagnetic radiation at a first frequency bandwidth about a first wavelength and the second filtering comprises blocking electromagnetic radiation at a second frequency bandwidth about the first wavelength, wherein the second frequency bandwidth is substantially similar to the first frequency bandwidth and wherein the first and second frequency bandwidths are within the ultraviolet to infrared spectrum, while each of the first and second metamaterials transmit ultraviolet to infrared electromagnetic radiation that is not in the first or second frequency bandwidth about the first wavelength;
wherein the filter is comprised in a film; and
wherein the first metamaterial is a Bragg reflector or a photonic crystal and the second metamaterial is a Bragg reflector or a photonic crystal, the method comprising:
selecting the size, shape, material or configuration of the structural features of the first and/or second metamaterial to provide the correct material properties to achieve said blocking of electromagnetic radiation within the electromagnetic spectrum, wherein the selecting comprises optimising the filter, to improve multi-angle performance, by monitoring optical properties of the combined filter at multiple angles of incidence whilst adjusting the sub-wavelength properties of the first and second metamaterials.

2. A method as claimed in claim 1 wherein the filter is comprised in or on a windscreen.

3. A method as claimed claim 1 wherein the filter is comprised in or on an aircraft cockpit.

4. A method as claimed in claim 1 wherein the filter is passive.

5. A method as claimed in claim 1 wherein the filter appears substantially transparent to the human eye.

6. A method as claimed in claim 1 wherein the first bandwidth and the second bandwidth are 5-10 nm.

7. A method as claimed in claim 1, wherein the first metamaterial comprises a plurality of structural features having a size in one dimension no greater than the second wavelength of the electromagnetic radiation.

8. A method as claimed in claim 7, wherein the first and/or the second metamaterial comprises a plurality of dielectric layers and the structural features are the respective thicknesses of the dielectric layers.

9. A method as claimed in claim 7, wherein the first and/or the second metamaterial comprises an array of material elements and the structural features are the material elements.

10. A method as claimed in claim 8, wherein a first dielectric layer of the plurality of the plurality of dielectric layers has a first refractive index $n_1$ and a second dielectric layer in the plurality of dielectric layers has a second, different, refractive index $n_2$ wherein said first and second dielectric layers form a Bragg reflector.

11. A method as claimed in claim 9, wherein the material elements are located in or on a surface of a host medium.

12. A method as claimed in claim 11, wherein the host medium comprises a dielectric material having a relative permittivity of less than or equal to 5.

13. A method as claimed in claim 9, wherein the plurality of material elements are arranged in a periodic structure in at least two dimensions.

* * * * *

UNITED STATES PATENT AND TRADEMARK OFFICE
CERTIFICATE OF CORRECTION

| | |
|---|---|
| PATENT NO. | : 10,996,385 B2 |
| APPLICATION NO. | : 16/170568 |
| DATED | : May 4, 2021 |
| INVENTOR(S) | : George Palikaras and Themos Kallos |

It is certified that error appears in the above-identified patent and that said Letters Patent is hereby corrected as shown below:

In the Claims

Claim 1, Line 36 "within the electromagnetic spectrum" should be changed to --within the ultraviolet to infrared electromagnetic spectrum--

Signed and Sealed this
Tenth Day of May, 2022

Katherine Kelly Vidal
*Director of the United States Patent and Trademark Office*